(Model.)

J. WOOD.
FISHING SPOON.

No. 395,103.   Patented Dec. 25, 1888.

Witnesses,
D. W. Johnson
H. Frank Chandler

Inventor,
James Wood.

UNITED STATES PATENT OFFICE.

JAMES WOOD, OF ROCHESTER, NEW YORK.

FISHING-SPOON.

SPECIFICATION forming part of Letters Patent No. 395,103, dated December 25, 1888.

Application filed June 4, 1888. Serial No. 276,045. (Model.)

*To all whom it may concern:*

Be it known that I, JAMES WOOD, a citizen of the United States, and residing at Rochester, in the county of Monroe and State of New York, have invented a new and useful Improvement for Trolling, Whipping, and Fishing, called a "Spinner," of which the following is a specification.

Heretofore fishing, especially trolling and whipping, has been done with great inconvenience and trouble and with poor results, by reason of the fact that the hooks used, always more or less exposed, were continually catching in the weeds, and at times, by reason thereof, causing a complete cessation of the sport.

My improvement relates to fish-bait called "spinners," in which the hooks are concealed, to be used in fishing, trolling, and whipping in any manner and in any and all waters, especially in waters in which weeds are abundant.

The objects of my invention are, first, to provide a spinner with concealed hooks to be used in fishing, trolling, and whipping, particularly among weeds, and of such a construction that the said spinner will be absolutely and entirely free from catching weeds or being caught by weeds; second, that the said concealed hooks will become exposed and come into use only when the spinner is caught and closed by fish. I attain these objects by the mechanism as illustrated in the accompanying drawings.

Figure 1:
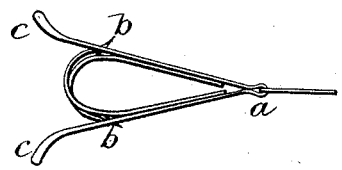
Figure 2:
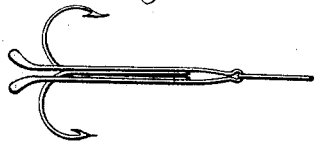
Figure 3:
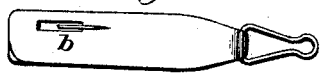
Figure 4:
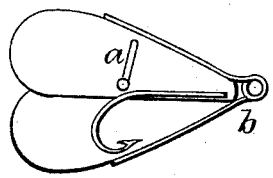
Figure 5:
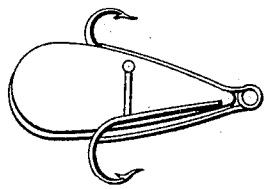

Figure 1 represents the spinner, showing the different parts of the improvement when the hooks are concealed. Fig. 2 represents the spinner, showing the different parts of the improvement when the spinner is closed and the hooks are exposed. Fig. 3 gives a side view of the spinner, showing the slot through which the hooks are forced and come into use. Fig. 4 shows a flat spinner, giving a view of the position of the improvement in which the hooks are concealed. Fig. 5 shows the same spinner as shown in Fig. 4, showing the position of the improvement when the hooks are exposed.

A long narrow piece of brass or other suitable material of the required length and breadth and of sufficient thickness to give the amount of spring necessary to keep the hooks concealed is bent into the shape of a letter V, as shown in Fig. 1. On either side of the inner portion of the brass or other material used is firmly fastened a hook or hooks, as shown in Fig. 1. At $b$ $b$ are slots in the sides of the spinner, through which the hooks pass and become exposed when the spinner is closed. The ends $c$ $c$ of the spinner are turned, as shown in Fig. 1. When the spinner is caught and the sides are brought together, the hooks become exposed, as shown in Fig. 2, and when the pressure is removed the spinner resumes its former position and the hooks again become concealed, as shown in Fig. 1.

Fig. 4 represents the improvement applied to a flat spinner, in which two flat wings, with the larger ends slightly turned in opposite directions, are used, with hooks fastened to the inside edge of each wing, as shown in Fig. 4. When the wings are caught and closed, the hooks slide by the outer edges of the wings and become exposed, as shown in Fig. 5. Upon the pressure being removed the wings resume their original position and the hooks again become concealed, as shown in Fig. 4.

Having thus fully described my invention, what I claim as new, and desire to secure by Letters Patent, is—

1. The combination, with the wings of a compressible spinner, of a hook securely attached to one wing and adapted to project beyond the opposite wing when the spinner is compressed, substantially as and for the purposes set forth.

2. The combination, with the spring-actuated wings of a compressible spinner, of hooks attached to each wing and adapted to project beyond the opposite wing when the spinner is compressed, substantially as and for the purposes set forth.

3. The combination, with the slotted spring-actuated wings of a compressible spinner, of hooks attached to each wing and adapted to project through the slots beyond the opposite wing, substantially as and for the purposes set forth.

4. The combination, with the wings $c\ c$ of a compressible spinner formed of a single piece of spring metal and provided with the slots $b\ b$, of hooks firmly attached to each wing and adapted to project beyond the opposite wing through the slots when the spinner is compressed, substantially as and for the purposes set forth.

JAMES WOOD.

Witnesses:
 DANIEL W. JOHNSON,
 W. FRANK CHANDLER.